United States Patent [19]
Avrillon

[11] Patent Number: 5,674,629
[45] Date of Patent: Oct. 7, 1997

[54] HIGHLY SELECTIVE ASYMMETRIC MEMBRANES FOR GAS SEPARATION

[75] Inventor: Rene Avrillon, Maisons Laffitte, France

[73] Assignee: Institut Francais du Petrole, Rueil Malmaison Cedex, France

[21] Appl. No.: 311,816

[22] Filed: Sep. 26, 1994

[30] Foreign Application Priority Data

Sep. 27, 1993 [FR] France .................. 93/11 549

[51] Int. Cl.$^6$ .................. B01D 59/12; B32B 27/08
[52] U.S. Cl. .................. 428/473.5; 428/447; 428/451
[58] Field of Search .................. 96/13; 428/473.5, 428/447, 451

[56] References Cited

U.S. PATENT DOCUMENTS

| | | | |
|---|---|---|---|
| 4,307,135 | 12/1981 | Fox | 427/244 |
| 4,880,441 | 11/1989 | Kesting et al. | 55/16 |
| 5,042,993 | 8/1991 | Meier et al. | 55/61 |
| 5,178,940 | 1/1993 | Matsumoto et al. | 428/304.4 |

FOREIGN PATENT DOCUMENTS

| | | |
|---|---|---|
| 0 241 937 | 10/1987 | European Pat. Off. . |
| 0 265 898 | 5/1988 | European Pat. Off. . |
| 0 509 260 | 10/1992 | European Pat. Off. . |
| 2193634 | 2/1974 | France . |

*Primary Examiner*—D. S. Nakarani
*Attorney, Agent, or Firm*—Millen, White, Zelano, & Branigan, P.C.

[57] ABSTRACT

A highly selective asymmetric membrane for gas separation is provided which comprises rigid aromatic polyimide or copolyimide polymers comprising the monomers diphenyldi(trifluoromethyl)methane 3,4,3',4'-tetracarboxylic acid adianhydride and a monoaromatic metadiamine or a mixture of monoaromatic metadiamines.

7 Claims, No Drawings

HIGHLY SELECTIVE ASYMMETRIC MEMBRANES FOR GAS SEPARATION

The present invention concerns highly selective membranes for gas separation using gas permeation. More specifically, the invention concerns asymmetric fluorinated polyimide membranes for gas separation and a method for the manufacture of said membranes. The membranes of the invention are particularly effective for decarbonising natural gas.

Certain fluorinated aromatic polyimides, more precisely polyimides containing diphenyldi(trifluoromethyl)methane 3,4,3',4'-tetracarboxylic acid dianhydride (hereinafter termed "6F dianhydride") as the dianhydride portion and a diamine containing one or more aromatic rings as the diamine portion, are known to have high permeabilities to certain gases and much lower permeabilities to other gases in their vitreous state. These polymers are, then, both highly permeable (to certain gases) and highly selective. Permeability measurements in pure gases have shown, for example, that some fluorinated aromatic polyimides are far more permeable to hydrogen, carbon dioxide or water vapour than to methane and considerably more permeable to oxygen than to nitrogen. Separation potentials of a polymer can be approximated from the permeability ratios measured in pure gases, termed the theoretical separation factors, and the initial results can then be improved by (more laborious) measurements in mixtures of gases. The observed selectivity in gas mixtures can be lower than the theoretical separation factor, particularly when one constituent of the mixture plasticises the polymer and thus facilitates transport of another gas. Carbon dioxide and water vapour, for example, tend to plasticise some aromatic polyimides. The gas permeability of a polymer is sensitive to temperature: permeability increases and selectivity decreases with increasing temperature. For some applications, gas permeation is carried out at temperatures well above room temperature, for example 50° C. to 60° C., in order to purify crude natural gas. Some aromatic polyimides derived from 6F anhydride have a higher than average selectivity and retain a large proportion of that selectivity at relatively high temperatures such as those just described. These highly selective polyimides are characterised by a very high glass transition temperature of the order of 300° C. or more, combined with very reduced chain flexibility. Manufacturing gas permeable membranes from such polyimides is highly desirable but they are difficult to manufacture by this method due to their low solubility in organic solvents, particularly the volatile solvents used to make high flux asymmetric membranes. The structure of these membranes consists of a thin, dense skin supported by a much thicker, porous substructure. The dense skin contributes the selectivity and the substructure contributes the mechanical resistance. Since the permeability of a membrane is in practice determined by that of the dense skin, it must be as thin as possible, for example of the order of a fraction of a micrometer; the substructure may, however, be as much as a fraction of a millimetre thick. The membranes can be in the form of flat sheets of hollow fibres. The asymmetric structure is normally produced by bringing one face of a film or capillary extrudate of polymer solution into contact with a liquid coagulant, ie, a liquid which is miscible with the solvent of the polymer but not in itself a solvent for the polymer. Before exposure to the coagulant, the face first superconcentrated in polymer, preferably by limited evaporation of the solvent. On contact with the coagulant, the solution gels on the surface and the remainder of the volume then divides into two dispersed phases, one polymer-rich, the other polymer-depleted and coagulant-rich. Elimination of the solvent and coagulant produces the asymmetric membrane. The permeability, selectivity and mechanical resistance of the membrane depends on the quality of the initial polymer solution. The solution filterability is an indication of its degree of homogeneity and stability. A solution which cannot be filtered through a filter with a retention limit of 0.5 micrometers, or at worst 1 micrometer, is considered to contain a high degree of coarse aggregates or to be in the process of becoming a gel.

Given the low solubility of the most selective (ie., the most rigid) polyimide derivatives of 6F dianhydride, the use of species which are slightly more flexible due to a diamine portion that allows local chain movements have been proposed. However, solubility is improved at the expense of the polymer selectivity. Thus relatively flexible polyimides obtained using methylenedianiline and oxydianiline generally have selectivities of about 25 and 30 respectively in $CO_2/CH_4$ mixtures at 55° C., while a more rigid polyimide obtained using metaphenylenediamine can, for example, have a selectivity of 44. This latter polyimide has been shown to have a selectivity of more than 50 under certain conditions. The gains in selectivity which can be expected when making membranes from more rigid polyimides can thus be seen.

One of the objects of the present invention is to provide asymmetric membranes constituted by polyimides which are sufficiently rigid to ensure high selectivities in gases, even at temperatures well above room temperature. A further object of the present invention is to provide a method of manufacture of said rigid polyimide asymmetric membranes for gas separation.

The membranes of the invention are constituted by polyimides or copolyimides wherein the dianhydride portion is 6F dianhydride with formula I:

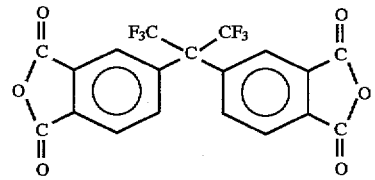

and the diamine portion is 1,3-diaminobenzene or metaphenylenediamine, abbreviated to mPDA, with formula II:

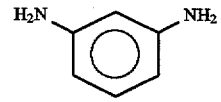

Alternatively, 1,3-diaminobenzene can be partially or completely replaced by one or more derivatives which are mono- or dimethylated on the aromatic ring. The membranes may be optionally coated with a layer of silicone elastomer on the skin side to protect it and seal any microperforations, in common with known practice.

The membranes of the invention, constituted as indicated above, have theoretical separation factors (permeance ratios measured in pure gas) of about 70 to 110 for the $CO_2/CH_4$ couple at room temperature, and effective selectivities (permeance ratios measured in a mixture of gases) of about 50 to 90 for the same $CO_2/CH_4$ couple at room temperature.

Fluorinated polyimides for manufacturing the membranes have glass transition temperatures of at least 250° C. and inherent viscosities of at least 0.3 (measured in solution in N-methylpyrrolidone, containing 1.0 gram of polymer per 100 ml of solvent). They can be prepared using conventional polyimide synthesis methods. However, polyimides having both relatively high molecular weights and acceptable solubilities are more easily produced by a chemical method in which polyamic acid is cyclised by addition of a dehydrating agent (for example, acetic anhydride plus triethylamine).

The invention concerns flat membranes and hollow fibres. In a preferred embodiment, a flat membrane is mechanically reinforced by a commercially available woven glass fabric or by a commercially available nonwoven polyester fabric.

The method of manufacture of the membranes of the invention is principally characterised by the association of a particular type of solvent and a particular type of coagulant which is specially adapted for the polyimides used. The operating conditions of the method obviously differ depending on whether flat membranes or hollow fibres are to be produced. The method consists in:

a) dissolving one or more specific polyimides of the invention, to a total polymer concentration of between 10% and 35% by weight with respect to the solution, in a solvent comprising at least 85% by weight of 1,4-dioxane and 0 to 15% by weight of N-methyl 2-pyrrolidone, N,N-dimethylacetamide and/or gamma-butyrolactone;

b) applying a film of the solution obtained to a support or extruding a hollow liquid filled fibre, using an annular die;

c) evaporating a portion of the solvent;

d) bringing the film or hollow fibre into contact with a liquid coagulant constituted by a mixture of acetic acid and water comprising 1% to 85% by weight of water, small quantities of other organic acids being optionally added to the mixture;

e) rapidly drying the film or hollow fibre, which has been preferably washed with water, methanol or ethanol; optionally f) heat treating the film or hollow fibre; and optionally g) coating the membrane skin with a thin layer of silicone elastomer to protect against abrasion and, if necessary, to seal microfissures or microperforations.

The method is normally carried out at room temperature, with the obvious exception of heat treatment step f).

The various steps of the method will be described in more detail below. The operations are carried out at room temperature, except where otherwise stated.

The polyimide(s) is/are dissolved in a solvent mixture which has been prepared in advance. The major solvent, 1,4-dioxane, and the complementary solvents, N-methyl 2-pyrrolidone, N,N-dimethylacetamide and/or gamma-butyrolactone, are preferably dehydrated before use using 3A molecular sieve. The solution may have a polymer concentration of 12% to 35% by weight, preferably 12% to 30% for a flat membrane and 15% to 35% for a hollow fibre. A concentration sufficient to produce a solution with a viscosity of around a hundred poises reduces the risk of rupture in the newly formed fibre. However, solutions with a concentration of more than 35% by weight have a tendency to produce membranes with low permeability. The polymer solution is filtered to 0.5 and, if possible, to about 0.2 micrometer.

The flat membrane is produced by using a bar or blade to apply the solution to a support which is preferably constituted by a woven or non-woven fabric whose uncoated face is protected against subsequent contact with the coagulant by a detachable polyolefin film. The woven or non-woven fabric will remain attached to the membrane to reinforce it mechanically. If the temperature selected for heat treatment is not above about 200° C., a non-woven polyester fabric can be used. Above this, a commercially available woven glass fibre fabric sized with a silane adherence enhancer, for example phenyltriethoxysilane, is used. The polymer solution deposited is preferably between 50 and 300 micrometers thick.

The hollow fibre is produced by extruding the polymer solution through the annular orifice of a die which also comprises a central circular orifice through which a fibre core-filling liquid or central liquid is injected. The two orifices are separated by a tubular wall with a negligible thickness at its extremity. The diameter of the central orifice and the width of the annular space are preferably substantially equal and between 0.05 and 0.5 millimetre. The central liquid is preferably a mixture of solvent and antisolvent in proportions which produce slightly coagulating properties in the mixture. The preferred flow rate of the liquid is about one eighth the flow rate of the solution.

At a distance of about 5 to 10 millimetres from the knife or die orifice, the film or extrudate is advantageously exposed to a current of nitrogen which results in superficial superconcentration of the polymer by solvent evaporation. The gas stream is guided towards the surface of the bath and released about 5 millimetres therefrom. Even if the flow rate and the nitrogen stream cannot be fixed independently of the exposure time of the film or hollow fibre to the stream and vice-versa, there is some latitude in the choice of operational conditions. In a preferred embodiment of the method, the evaporation time is between 0.3 and 1 second and the gas stream is 0.5 to 1.5 centimetres thick at an average speed of 2 to 10 centimetres per second.

The film or hollow fibre is subsequently immersed in a coagulant bath where it remains for at least 4 seconds, preferably between 5 and 20 seconds. The coagulant is constituted by a mixture of acetic acid and water with an acetic acid content of between 15% and 99% by weight, preferably between 15% and 80% by weight. More particularly, in the case where the diamine portion of the polyimide is 1,3-diaminobenzene, the preferred water content in the coagulant is between 40% and 85% by weight when the solvent mixture contains N-methyl 2-pyrrolidone, between 50% and 85% by weight when the solvent mixture contains N,N-dimethylacetamide, and between 55% and 85% by weight when the solvent mixture contains gamma-butyrolactone. 1% to 5% by weight of formic acid and/or propanoic acid may optionally be added to the coagulant. It may also contain small quantities of methanol and/or ethanol, preferably less than a fifth of the weight of the water. It can be filtered before use, for example, to about 0.2 micrometers.

Advantageously, the coagulated membrane is washed in a bath of water or a low alcohol such as methanol or ethanol before removal, if necessary, of the polyolefin protection. The residence time for the membrane in the washing bath is preferably more than 10 seconds and can, for example, be as long as 5 minutes.

The membrane is dried in a current of air at a temperature of between room temperature and about 50° C. The membrane is then heat treated, preferably in a low vacuum with increasing temperature, up to a value of between 90° C. and 350° C., preferably between 110° C. and 200° C.

Finally, the membrane can be coated on its skin side with a thin silicone elastomer layer. The membrane skin is brought into contact, for a period of several seconds to several minutes, with a commercially available formulation (such as Sylgard 184® from DOW CORNING) which is diluted in a light saturated hydrocarbon such as pentane which is evaporated off at the end of the operation.

Asymmetric membranes of the invention are remarkable not only for their high separation factors and selectivities in gases at room temperature, but also for their physical stability at higher temperatures which means that they are effective in the separation of hot gases.

In this respect, preferred membranes are those which are constituted by a polyimide which has been synthesized from 6F dianhydride and 1,3-diaminobenzene. These membranes can have $CO_2/CH_4$ theoretical separation factors of about 100 to 110 at room temperature and about 75 to 85 at 55° C., and selectivities of about 80 to 90 at room temperature and about 40 to 70 at 55° C. The $CO_2$ permeances of these preferred membranes can be of the order of $2.10^{-10}$ to $4.5.10^{-10}$ $Nm^3.m^{-2}.s^{-1}.Pa^{-1}$ (ie., about $2.7.10^{-5}$ to $6.0.10^{-5}$ $Ncm^3.cm^2.s^{-1}.cmHg^{-1}$) at room temperature and about $2.5.10^{-10}$ to $6.10^{-10}$ $Nm^3.m^{-2}.s^{-1}.Pa^{-1}$ (ie., about $3.3.10^{-5}$ to $8.0.10^{-5}$ $Ncm^3.cm^2.s^{-1}.cmHg^{-1}$) at 55° C.

The following examples are given by way of illustration of the invention and do not in any way limit the scope thereof. Gas permeance measurements in gas mixtures were carried out under the following conditions. The skin side of the membrane was swept with a current of pressurised gas mixture at a flow rate which was sufficient to be able to assume that the composition of the mixture was negligibly affected by the permeate stream. This flow rate, determined by experiment, was such that the partial flow rate of the gas which permeated most rapidly ($CO_2$, $H_2$ or $O_2$) was 50 times the partial flow rate of the same gas in the permeate stream.

The permeate composition was determined by gas chromatography. Partial pressure differentials of each gas were used to calculate the permeances of the gases in the mixture. The separation factors (theoretical) and selectivities (effective) were the ratios of the permeances of the two gases measured respectively in pure gas and in the gas mixture.

EXAMPLES 1-3

Examples 1 to 3 illustrate the production of flat 6F/mPDA polyimide asymmetric membranes under different solvent medium conditions for polymer synthesis and for preparation of the coagulating solution. The composition of the coagulant was different in each case.

In example 1, a fluorinated aromatic polyimide with a repeating unit having formula III:

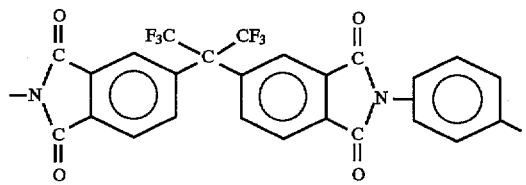

was prepared using a chemical imidisation method. 177.70 g of 6F dianhydride (formula I) was gradually added to 43.26 g of 1,3-diaminobenzene in 700 ml of N-methyl 2-pyrrolidone at 35° C. and under nitrogen, with stirring. Stirring was continued for 1 hour after addition was complete. 700 g of a mixture of equal weights of acetic anhydride and triethylamine was then introduced, with continued stirring. This stirring was continued for 3 further hours. The polyimide was precipitated out by pouring the solution into several times its volume of vigorously stirred ethanol. This was filtered, the precipitate was washed and then vacuum dried for 12 hours at room temperature, then 4 hours at 60° C. and finally for 2 hours at 150° C. Analysis of the solid obtained indicated that it still contained 0.5% by weight of N-methyl 2-pyrrolidone. The polyimide had an inherent viscosity of 0.80 dl/g.

The polyimide was dissolved, under helium and with gentle stirring, in a mixture of 1,4-dioxane and N-methyl 2-pyrrolidone which had been predried with 3A molecular sieve, to produce a solution with the following composition by weight: 6F/mPDA polyimide: 22%; 1,4-dioxane: 74%; N-methyl 2-pyrrolidone: 4% including the residual amount in the polymer. The solution was filtered to 0.2 µm under pressurised helium then allowed to degas under helium at atmospheric pressure for 12 hours in a vessel which was sufficiently wide for the liquid to be less than 5 cm deep.

A film of the solution with a thickness of about 150 µm was deposited, using a blade applicator, on a commercially available nonwoven polyester fabric band with a thickness of 100 µm and width of 1 m advancing at a rate of 3 m per minute. The film was exposed for 6 seconds to a tangential 300 l per minute stream of dry nitrogen circulating in the opposite direction to that of the film, between the film and a wall placed 1 cm therefrom. The wall was flanged at its edges to prevent the nitrogen stream from reaching the face of the film against the nonwoven fabric.

The film was then immersed for 15 seconds in a coagulant bath consisting of a mixture of 52% by weight acetic acid in water, filtered to 0.2 µm. The mixture was continuously changed at a rate of 5 l per minute. The film, which had become an asymmetric membrane, was washed for 20 seconds in a counter-current of ethanol hydrated to about 10% by weight of water, changed at a rate of 5 l per minute. The extrusion, coagulation and washing operations were carried out at about 20° C. The membrane then passed through a drying tunnel using dry air at 40° C. before being rolled onto a metal bobbin. The bobbin was placed in a vacuum oven where the membrane was exposed to a temperature of 150° C. for 12 hours. Finally, the membrane skin was treated conventionally by coating it with a silicone elastomer layer. The membrane was unrolled horizontally from the bobbin with the skin side downwards. The skin was sprayed with a 7% by weight solution in pentane of Sylgard 184® from DOW CORNING in pentane. A 3 centimetre margin at the edges was coated with a Teflon® mask. This margin was used to seal the membrane during the manufacture of conventional spiral. type modules. The membrane was dried at 40° C. in a slow stream of nitrogen before being rolled up again onto a further bobbin.

The permeances, separation factors and selectivities of the membrane were evaluated using measurements carried out in pure carbon dioxide ($CO_2$), pure hydrogen ($H_2$), pure methane ($CH_4$), a $CO_2$—$CH_4$ mixture saturated with water vapour, a $H_2$—$CH_4$ mixture and finally a $O_2$—$N_2$ mixture. Measurements on the mixture of $CO_2$ and $CH_4$ were carried out under two different pressure and temperature conditions, combining relatively high temperatures and high partial pressures of $CO_2$.

The results are shown in Table 1 below.

Example 2 differs from Example 1 in using N,N-dimethylacetamide as the solvent both for the synthesis of the polyimide and for the preparation of the coagulating solution, which also modified the composition of the coagulant. The inherent viscosity of the polyimide was 0.75 dl/g. The polymer obtained had a residual solvent content of 0.7% by weight. The composition by weight of the coagulating solution was as follows: 6F/mPDA polyimide: 22%; 1,4-dioxane: 74%; N,N-dimethylacetamide: 4%. The composition by weight of the coagulant was 55% acetic acid and 45% water.

Permeances, separation factors and selectivities of the membrane towards the gases are given in Table 2 below.

Example 3 differs from Example 1 only in that gamma-butyrolactone was used to prepare the polyimide solution for coagulation. The synthesis solvent and the coagulant were unchanged. The coagulating solvent, which contained a little of the synthesizing solvent carried by the polymer, had the following composition by weight: 6F/mPDA polyimide: 22%; 1,4-dioxane: 74%; gamma-butyrolactone: 3.9%; N-methyl 2-pyrrolidone: 0.1%.

Membrane permeances and selectivities in the gases are given in Table 3 below.

EXAMPLES 4 AND 5

These examples illustrate the production of flat asymmetric membranes from 6F/mPDA polyimides which have been monomethylated on the aromatic ring of the diamine. These polyimides had far higher permeabilities than that of 6F/mPDA polyimide but, on the other hand, had lower selectivities.

Example 4 concerns an asymmetric membrane constituted by a polyimide obtained by polycondensation of 6F dianhydride and 2,6-diaminotoluene or 2,6-toluenediamine, abbreviated to 2,6-TDA, with a repeating unit having formula IV:

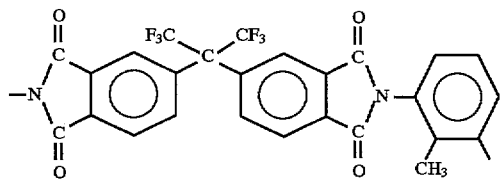

Synthesis of this polyimide was as described for Example 1 except that 48.87 g of 2,6-diaminotoluene was reacted with 177.70 g of 6F dianhydride. The polyimide had an inherent viscosity of 0.83 dl/g. The membrane was formed as in Example 1 except that the coagulant was composed of 55% by weight of acetic acid and 45% by weight of water. Gas permeances and selectivities of the membrane are shown in Table 4 below.

Example 5 concerns a flat asymmetric membrane constituted by a polyimide obtained by polycondensation of 6F dianhydride and 2,4-diaminotoluene or 2,4-toluenediamine, abbreviated to 2,4-TDA, with a repeating unit having formula V:

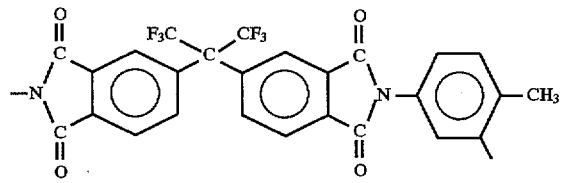

Synthesis of this polyimide was as described for Example 1 except that 54.48 g of 2,4-diaminotoluene was reacted with 177.70 g of 6F dianhydride.

The polyimide had an inherent viscosity of 0.91 dl/g. The membrane was formed as in Example 1 except that the coagulant was composed of 57% by weight of acetic acid and 43% by weight of water. Gas permeances and selectivities of the membrane are shown in Table 5 below.

COMPARATIVE EXAMPLES 1–22

These examples illustrate the mediocre gas separation capability, due to lack of selectivity and/or permeability, of flat asymmetric membranes produced by methods which only differed from the method of the invention (Example 1) in the nature of the polyimide solvent and, where appropriate, that of the coagulant. The results are shown in Table 6 below.

COMPARATIVE EXAMPLES 23–26

These examples illustrate the effect on gas separation capability of flat asymmetric membranes produced by methods which only differed from the method of the invention (Example 1) in the chemical nature of the coagulant. The results, shown in Table 7 below, show very large reductions in permeance.

COMPARATIVE EXAMPLES 27–30

These examples illustrate the effect on gas separation capability of flat asymmetric membranes produced by methods which only differed from the method of the invention (Example 1) in the proportions of components in the coagulant. The results are shown in Table 8 below. They indicate a rapid reduction in selectivity when the acetic acid content of the aqueous acetic acid solution goes above the maximum value defined in the method of the invention. The results also show a rapid reduction in permeance when the acetic acid content of the aqueous acetic acid solution drops below the minimum value defined in the method of the invention.

COMPARATIVE EXAMPLES 31 AND 32

These examples illustrate the effect on gas separation capability of flat asymmetric membranes produced by methods which only differed from the method of the invention (Example 1) in the proportions of the components of the polyimide solvent. The results are shown in Table 9 below. They show a rapid reduction in selectivity when the 1,4-dioxane content of the solvent drops below the minimum value defined in the method of the invention.

EXAMPLES 6 AND 7

Examples 6 and 7 illustrate production of fluorinated aromatic polyimide asymmetric membranes in the from of hollow fibres.

Example 6 concerns a hollow asymmetric 6F/mPDA polyimide fibre.

The polyimide was synthesized and the coagulating solution was prepared as described for Example 1, including the quantities of polymer and solution. This had a composition by weight of 22% of polyimide, 74% of 1,4-dioxane and 4% of N-methyl 2-pyrrolidone. In addition, a stock of central liquid was made by mixing 50 g of acetic acid, 50 g of water and 25 g of 1,4-dioxane and filtering the mixture to 0.2 µm. A die with the following characteristics was used: external diameter of annular orifice: 0.6 mm; internal diameter of annular orifice: 0.2 mm; central orifice diameter: 0.19 mm. The extremity of the separation tube for the two orifices was located 1 mm forward of the extremity of the external wall of the annular orifice.

The coagulation bath was filled with 20 l of coagulant prepared as in Example 1 and constituted by an aqueous solution of 52% by weight acetic acid. The height of the liquid in the bath was 1.2 m. The coagulant was continuously changed at a rate of 0.5 l per minute. The extremity of the die was positioned 5 cm above the coagulant level. It was positioned in a vertical glass tube of 2 cm internal diameter which opened 5 mm above the coagulant surface. The hollow fibre was formed under the following conditions: the polyimide solution was extruded at a rate of 200 ml per hour while the central liquid was emitted at a rate of 30 ml per hour and dry nitrogen circulated around the extrudate in a descending stream at a rate of 92 l per hour. The extrudate stayed in the coagulant for 15 seconds before emerging vertically in the form of a massive flexible hollow fibre pulled at a rate which was sufficient to avoid its accumulation in the bath. The hollow fibre was then washed for 20 seconds in a counter-current of ethanol containing about 10% by weight of water, changed at a rate of 0.5 l per minute. The extrusion, coagulation and washing operations were carried out at about 20° C. The washed fibre passed through a drying tunnel of dry air at 40° C. before being deposited in a cylindrical metal receptacle. The receptacle was placed in a vacuum oven where the membrane was exposed to a temperature of 150° C. for 12 hours.

Finally, the membrane was conventionally coated with a layer of silicone elastomer. This was carried out by passing the hollow fibre, taken up on a winding means, through a bath of a solution in pentane of 7% by weight of Sylgard 184® from DOW CORNING and drying in a slow stream of nitrogen at 40° C.

Permeances and selectivities of the membrane, measured in mixed gases, are shown in Table 10 below.

Example 7 concerns an asymmetric hollow 6F/2,6-TDA polyimide fibre.

Synthesis of the polyimide was carried out as described in Example 4 and the membrane was manufactured as described in Example 5.

Permeances and selectivities for the membrane, measured for gas mixtures, are shown in Table 11 below.

TABLE 1

|  | Pure Gases ($CO_2$ and $CH_4$) | Mixture (water saturated) $CO_2$ (30% mol) + $CH_4$ (70% mol) | | Mixture $H_2$ (20% mol) + $CH_4$ (80% mol) | Mixture $O_2$ (20% mol) + $N_2$ (80% mol) |
| --- | --- | --- | --- | --- | --- |
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* $CO_2$ | 58 | 56 | 75 | | |
| Permeance* $CH_4$ | 0.53 | | | | |
| Theoretical Sep'n Factor $CO_2/CH_4$ | 109 | | | | |
| Sel'y $CO_2/CH_4$ | | 90 | 60 | | |
| Permeance* $H_2$ | | | | 210 | |
| Sel'y $H_2/CH_4$ | | | | 370 | |
| Permeance* $O_2$ | | | | | 18 |
| Sel'y $O_2/H_2$ | | | | | 7.1 |

*in $10^{-6}$ $Ncm^3 \cdot cm^{-2} \cdot s^{-1} \cdot cmHg^{-1}$ or $7.5 \; 10^{-12}$ $Nm^3 \cdot m^{-2} \cdot s^{-1} \cdot Pa^{-1}$
**upstream pressure (downstream pressure 0.11 MPa)
***upstream pressure (downstream pressure ⁻0.05 MPa)

TABLE 2

|  | Pure Gases ($CO_2$ and $CH_4$) | Mixture (water saturated) $CO_2$ (30% mol) + $CH_4$ (70% mol) | | Mixture $H_2$ (20% mol) + $CH_4$ (80% mol) | Mixture $O_2$ (20% mol) + $N_2$ (80% mol) |
| --- | --- | --- | --- | --- | --- |
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* $CO_2$ | 61 | 59 | 77 | | |
| Permeance* $CH_4$ | 0.57 | | | | |
| Theoretical Sep'n Factor $CO_2/CH_4$ | 107 | | | | |
| Sel'y $CO_2/CH_4$ | | 88 | 57 | | |
| Permeance* $H_2$ | | | | 220 | |
| Sel'y $H_2/CH_4$ | | | | 355 | |
| Permeance* $O_2$ | | | | | 20 |
| Sel'y $O_2/H_2$ | | | | | 6.7 |

*in $10^{-6}$ $Ncm^3 \cdot cm^{-2} \cdot s^{-1} \cdot cmHg^{-1}$ or $7.5 \; 10^{-12}$ $Nm^3 \cdot m^{-2} \cdot s^{-1} \cdot Pa^{-1}$
**upstream pressure (downstream pressure 0.11 MPa)
***upstream pressure (downstream pressure ⁻0.05 MPa)

TABLE 3

|  | Pure Gases ($CO_2$ and $CH_4$) | Mixture (water saturated) $CO_2$ (30% mol) + $CH_4$ (70% mol) | | Mixture $H_2$ (20% mol) + $CH_4$ (80% mol) | Mixture $O_2$ (20% mol) + $N_2$ (80% mol) |
|---|---|---|---|---|---|
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* $CO_2$ | 59 | 52 | 72 | | |
| Permeance* $CH_4$ | 0.55 | | | | |
| Theoretical Sep'n Factor $CO_2/CH_4$ | 108 | | | | |
| Sel'y $CO_2/CH_4$ | | 89 | 59 | | |
| Permeance* $H_2$ | | | | 205 | |
| Sel'y $H_2/CH_4$ | | | | 360 | |
| Permeance* $O_2$ | | | | | 16 |
| Sel'y $O_2/H_2$ | | | | | 7.0 |

*in $10^{-6}$ $Ncm^3 \cdot cm^{-2} \cdot s^{-1} \cdot cmHg^{-1}$ or 7.5 $10^{-12}$ $Nm^3 \cdot m^{-2} \cdot s^{-1} \cdot Pa^{-1}$
**upstream pressure (downstream pressure 0.11 MPa)
***upstream pressure (downstream pressure ~0.05 MPa)

TABLE 4

|  | Pure Gases ($CO_2$ and $CH_4$) | Mixture (water saturated) $CO_2$ (30% mol) + $CH_4$ (70% mol) | | Mixture $H_2$ (20% mol) + $CH_4$ (80% mol) | Mixture $O_2$ (20% mol) + $N_2$ (80% mol) |
|---|---|---|---|---|---|
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* $CO_2$ | 177 | 170 | 240 | | |
| Permeance* $CH_4$ | 2.3 | | | | |
| Theoretical Sep'n Factor $CO_2/CH_4$ | 77 | | | | |
| Sel'y $CO_2/CH_4$ | | 60 | 42 | | |
| Permeance* $H_2$ | | | | 420 | |
| Sel'y $H_2/CH_4$ | | | | 140 | |
| Permeance* $O_2$ | | | | | 77 |
| Sel'y $O_2/H_2$ | | | | | 6.6 |

*in $10^{-6}$ $Ncm^3 \cdot cm^{-2} \cdot s^{-1} \cdot cmHg^{-1}$ or 7.5 $10^{-12}$ $Nm^3 \cdot m^{-2} \cdot s^{-1} \cdot Pa^{-1}$
**upstream pressure (downstream pressure 0.11 MPa)
***upstream pressure (downstream pressure ~0.05 MPa)

TABLE 5

|  | Pure Gases ($CO_2$ and $CH_4$) | Mixture (water saturated) $CO_2$ (30% mol) + $CH_4$ (70% mol) | | Mixture $H_2$ (20% mol) + $CH_4$ (80% mol) | Mixture $O_2$ (20% mol) + $N_2$ (80% mol) |
|---|---|---|---|---|---|
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* $CO_2$ | 197 | 190 | 270 | | |
| Permeance* $CH_4$ | 2.7 | | | | |
| Theoretical Sep'n Factor $CO_2/CH_4$ | 73 | | | | |
| Sel'y $CO_2/CH_4$ | | 57 | 40 | | |
| Permeance* $H_2$ | | | | 560 | |
| Sel'y $H_2/CH_4$ | | | | 135 | |
| Permeance* $O_2$ | | | | | 90 |
| Sel'y $O_2/H_2$ | | | | | 6.5 |

*in $10^{-6}$ $Ncm^3 \cdot cm^{-2} \cdot s^{-1} \cdot cmHg^{-1}$ or 7.5 $10^{-12}$ $Nm^3 \cdot m^{-2} \cdot s^{-1} \cdot Pa^{-1}$
**upstream pressure (downstream pressure 0.11 MPa)
***upstream pressure (downstream pressure ~0.05 MPa)

TABLE 6

(comparative examples not in accordance with the invention)

| | | | | | | Permeametry at 20° C. with pure gases Upstream pressure: 0.8 MPa Downstream pressure 0.05 MPa | | | Permeametry at 20° C. in gas mixtures Upstream pressure: 7 MPa Downstream pressure: 0.11 MPa | | | |
|---|---|---|---|---|---|---|---|---|---|---|---|---|
| | | | | | | | | | $CO_2 + CH_4$ mixture 30–70% mol (water saturated) | | $H_2 + CH_4$ mixture 20–80% mol | |
| Ex No | Poly-imide | Solvent | Coagulant | Filtrat'n quality of solution | Phys'l char's of filtered solution | Per-meance* to $CO_2$ | Per-meance* to $CH_4$ | $CO_2/CH_4$ Sep'n Factor | Permeance* to $CO_2$ | $CO_2/CH_4$ sel'y | Permeance* to $H_2$ | $H_2/CH_4$ sel'y |
| 1 | 6F/mPDA | N-methyl 2-pyrrol-idone | water | 0.5 μm | clear no gel | 12 | 0.26 | 47 | 12 | 38 | 47 | 136 |
| 2 | 6F/mPDA | N-methyl 2-pyrrol-idone | methanol | 0.5 μm | clear no gel | 14 | 0.31 | 45 | 14 | 37 | 55 | 125 |
| 3 | 6F/mPDA | N-methyl 2-pyrrol-idone | ethanol | 0.5 μm | clear no gel | 13 | 0.28 | 46 | 13 | 37 | 49 | 130 |
| 4 | 6F/mPDA | N-methyl 2-pyrrol-idone | 50/50 wt % acetic acid + water | 0.5 μm | clear no gel | 17 | 0.40 | 42 | 16 | 35 | 69 | 108 |
| 5 | 6F/mPDA | NNdimethyl acetamide | water | 0.5 μm | clear no gel | 14 | 0.33 | 43 | 14 | 36 | 56 | 118 |
| 6 | 6F/mPDA | NNdimethyl acetamide | methanol | 0.05 μm | clear no gel | 18 | 0.44 | 41 | 17 | 35 | 68 | 112 |
| 7 | 6F/mPDA | NNdimethyl acetamide | 50/50 wt % acetic acid + water | 0.5 μm | clear no gel | 20 | 0.50 | 40 | 19 | 34 | 71 | 103 |
| 8 | 6F/mPDA | γ-butyro-lactone | water | 0.5 μm | clear no gel | 10 | 0.21 | 48 | 10 | 39 | 41 | 142 |
| 9 | 6F/mPDA | γ-butyro-lactone | methanol | 0.5 μm | clear no gel | 10 | 0.22 | 46 | 10 | 38 | 43 | 140 |
| 10 | 6F/mPDA | γ-butyro-lactone | 50/50 wt % acetic acid + water | 0.5 μm | clear no gel | 12 | 0.29 | 42 | 12 | 35 | 47 | 133 |
| 11 | 6F/mPDA | tetra-hydrofuran | water | 0.5 μm | clear beginning to gel | 7 | 0.16 | 45 | 7 | 37 | 27 | 120 |
| 12 | 6F/mPDA | tetra-hydrofuran | methanol | 0.5 μm | clear beginning to gel | 79 | 1.8 | 44 | 77 | 36 | 29 | 115 |
| 13 | 6F/mPDA | tetra-hydrofuran | 50/50 wt % acetic acid + water | 0.5 μm | clear beginning to gel | 80 | 2.1 | 39 | 79 | 33 | 34 | 101 |
| 14 | 6F/mPDA | acetone | water | 1 μm | clear beginning to gel | 77 | 1.7 | 45 | 75 | 36 | 20 | 125 |
| 15 | 6F/mPDA | acetone | methanol | 1 μm | clear beginning to gel | 6 | 0.14 | 44 | 6 | 36 | 22 | 120 |
| 16 | 6F/mPDA | acetone | 50/50 wt % acetic acid + water | 1 μm | clear beginning to gel | 8 | 0.20 | 40 | 8 | 34 | 28 | 105 |
| 17 | 6F/26TDA | N-methyl 2-pyrrol-idone | water | 0.5 μm | clear no gel | 28 | 0.70 | 40 | 27 | 34 | 85 | 54 |
| 18 | 6F/26TDA | N-methyl 2-pyrrol-idone | methanol | 0.5 μm | clear no gel | 32 | 0.84 | 38 | 31 | 33 | 96 | 50 |
| 19 | 6F/26TDA | N-methyl 2-pyrrol-idone | 50/50 wt % acetic acid + | 0.5 μm | clear no gel | 38 | 1.2 | 32 | 36 | 30 | 121 | 44 |

5,674,629

TABLE 6-continued (comparative examples not in accordance with the invention)

| | | | | | | Permeametry at 20° C. with pure gases Upstream pressure: 0.8 MPa Downstream pressure ⁻ 0.05 MPa | | | Permeametry at 20° C. in gas mixtures Upstream pressure: 7 MPa Downstream pressure: 0.11 MPa | | | |
|---|---|---|---|---|---|---|---|---|---|---|---|
| | | | | | | | | | $CO_2 + CH_4$ mixture 30–70% mol (water saturated) | | $H_2 + CH_4$ mixture 20–80% mol |
| Ex No | Poly- imide | Solvent | Coagulant | Filtrat'n quality of solution | Phys'l char's of filtered solution | Per- meance* to $CO_2$ | Per- meance* to $CH_4$ | $CO_2/CH_4$ Sep'n Factor | Permeance* to $CO_2$ | $CO_2/CH_4$ sel'y | Permeance* to $H_2$ | $H_2/CH_4$ sel'y |
| 20 | 6F/ 24TDA | N-methyl 2-pyrrol- idone | water | 0.5 μm | clear no gel | 42 | 1.1 | 39 | 40 | 33 | 97 | 52 |
| 21 | 6F/ 24TDA | N-methyl 2-pyrrol- idone | methanol | 0.5 μm | clear no gel | 46 | 1.2 | 38 | 45 | 31 | 115 | 47 |
| 22 | 6F/ 24TDA | N-methyl 2-pyrrol- idone | 50/50 wt % acetic acid + water | 0.5 μm | clear no gel | 50 | 1.4 | 36 | 48 | 30 | 137 | 42 |

*in $10^{-6}$ $Ncm^3 \cdot cm^{-2} \cdot s^{-1} \cdot cmHg^{-1}$ or $7.5 \cdot 10^{-12}$ $Nm^3 \cdot m^{-2} \cdot s^{-1} \cdot Pa^{-1}$

TABLE 7

(comparative examples not in accordance with the invention)

| | | | | | | Permeametry at 20° C. with pure gases Upstream pressure: 0.8 MPa Downstream pressure ⁻ 0.05 MPa | | | Permeametry at 20° C. in gas mixtures Upstream pressure: 7 MPa Downstream pressure: 0.11 MPa | | | |
|---|---|---|---|---|---|---|---|---|---|---|---|
| | | | | | | | | | $CO_2 + CH_4$ mixture 30–70% mol (water saturated) | | $H_2 + CH_4$ mixture 20–80% mol |
| Ex No | Poly- imide | Solvent | Coagulant | Filtrat'n quality of solution | Phys'l char's of filtered solution | Per- meance* to $CO_2$ | Per- meance* to $CH_4$ | $CO_2/CH_4$ Sep'n Factor | Permeance* to $CO_2$ | $CO_2/CH_4$ sel'y | Permeance* to $H_2$ | $H_2/CH_4$ sel'y |
| 23 | 6F/ mPDA | 1,4- dioxane + N-methyl 2-pyrrol- idone 95/5 wt % | water | 0.5 μm | clear no gel | 12 | 0.31 | 39 | 12 | 33 | 45 | 110 |
| 24 | 6F/ mPDA | 1,4- dioxane + N-methyl 2-pyrrol- idone 95/5 wt % | methanol | 0.5 μm | clear no gel | 15 | 0.37 | 40 | 14 | 35 | 51 | 125 |
| 25 | 6F/ mPDA | 1,4- dioxane + N-methyl 2-pyrrol- idone 95/5 wt % | ethanol | 0.5 μm | clear no gel | 20 | 0.49 | 41 | 19 | 35 | 72 | 130 |
| 26 | 6F/ mPDA | 1,4- dioxane + N-methyl 2-pyrrol- idone 95/5 wt % | n-heptane | 0.5 μm | clear no gel | 10 | 0.20 | 51 | 10 | 42 | 38 | 155 |

*in $10^{-6}$ $Ncm^3 \cdot cm^{-2} \cdot s^{-1} \cdot cmHg^{-1}$ or $7.5 \cdot 10^{-12}$ $Nm^3 \cdot m^{-2} \cdot s^{-1} \cdot Pa^{-1}$

TABLE 8

(comparative examples not in accordance with the invention)

| Ex No | Poly-imide | Solvent | Coagulant | Filtrat'n quality of solution | Phys'l char's of filtered solution | Permeametry at 20° C. with pure gases Upstream pressure: 0.8 MPa Downstream pressure ~ 0.05 MPa | | | Permeametry at 20° C. in gas mixtures Upstream pressure: 7 MPa Downstream pressure: 0.11 MPa | | | |
|---|---|---|---|---|---|---|---|---|---|---|---|---|
| | | | | | | | | | $CO_2 + CH_4$ mixture 30–70% mol (water saturated) | | $H_2 + CH_4$ mixture 20–80% mol | |
| | | | | | | Per-meance* to $CO_2$ | Per-meance* to $CH_4$ | $CO_2/CH_4$ Sep'n Factor | Permeance* to $CO_2$ | $CO_2/CH_4$ sel'y | Permeance* to $H_2$ | $H_2/CH_4$ sel'y |
| 27 | 6F/mPDA | 1,4-dioxane + N-methyl 2-pyrrol-idone 95/5 wt % | acetic acid + water 98/2 wt % | 0.5 μm | clear no gel | 54 | 1.5 | 36 | 52 | 30 | 130 | 12 |
| 28 | 6F/mPDA | 1,4-dioxane + N-methyl 2-pyrrol-idone 95/5 wt % | acetic acid + water 90/10 wt % | 0.5 μm | clear no gel | 46 | 0.78 | 59 | 43 | 49 | 163 | 128 |
| 29 | 6F/mPDA | 1,4-dioxane + N-methyl 2-pyrrol-idone 95/5 wt % | acetic acid + water 15/85 wt % | 0.5 μm | clear no gel | 30 | 0.54 | 56 | 29 | 47 | 109 | 163 |
| 30 | 6F/mPDA | 1,4-dioxane + N-methyl 2-pyrrol-idone 95/5 wt % | acetic acid + water 5/95 wt % | 0.5 μm | clear no gel | 24 | 0.48 | 50 | 23 | 41 | 84 | 149 |

*in $10^{-6}$ Ncm$^3 \cdot$ cm$^{-2} \cdot$ s$^{-1} \cdot$ cmHg$^{-1}$ or $7.5 \cdot 10^{-12}$ Nm$^3 \cdot$ m$^{-2} \cdot$ s$^{-1} \cdot$ Pa$^{-1}$

TABLE 9

(comparative examples not in accordance with the invention)

| Ex No | Poly-imide | Solvent | Coagulant | Filtrat'n quality of solution | Phys'l char's of filtered solution | Permeametry at 20° C. with pure gases Upstream pressure: 0.8 MPa Downstream pressure ~0.05 MPa | | | Permeametry at 20° C. in gas mixtures Upstream pressure: 7 MPa Downstream pressure: 0.11 MPa | | | |
|---|---|---|---|---|---|---|---|---|---|---|---|---|
| | | | | | | | | | $CO_2 + CH_4$ mixture 30–70% mol (water saturated) | | $H_2 + CH_4$ mixture 20–80% mol | |
| | | | | | | Perm-eance* to $CO_2$ | Perm-eance* to $CH_4$ | $CO_2/CH_4$ Sep'n Factor | Permeance* to $CO_2$ | $CO_2/CH_4$ sel'y | Permeance* to $H_2$ | $H_2/CH_4$ sel'y |
| 31 | 6F/mPDA | 1,4-dioxane + N-methyl 2-pyrrol-idone 70/30 wt % | acetic acid + water 50/50 wt % | 0.5 μm | clear no gel | 15 | 0.33 | 45 | 15 | 38 | 56 | 137 |
| 32 | 6F/mPDA | 1,4-dioxane + N-methyl 2-pyrrol-idone 80/20 wt % | acetic acid + water 50/50 wt % | 0.5 μm | clear no gel | 23 | 0.45 | 51 | 22 | 43 | 79 | 168 |

*in $10^{-6}$ Ncm$^3 \cdot$ cm$^{-2} \cdot$ s$^{-1} \cdot$ cmHg$^{-1}$ or $7.5 \cdot 10^{-12}$ Nm$^3 \cdot$ m$^{-2} \cdot$ s$^{-1} \cdot$ Pa$^{-1}$

TABLE 10

|  | Pure Gases (CO$_2$ and CH$_4$) | Mixture (water saturated) CO$_2$ (30% mol) + CH$_4$ (70% mol) | | Mixture H$_2$ (20% mol) + CH$_4$ (80% mol) | Mixture O$_2$ (20% mol) + N$_2$ (80% mol) |
| --- | --- | --- | --- | --- | --- |
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* CO$_2$ | 57 | 51 | 68 | | |
| Permeance* CH$_4$ | 0.52 | | | | |
| Theoretical Sep'n Factor CO$_2$/CH$_4$ | 110 | | | | |
| Sel'y CO$_2$/CH$_4$ | | 96 | 59 | | |
| Permeance* H$_2$ | | | | 200 | |
| Sel'y H$_2$/CH$_4$ | | | | 360 | |
| Permeance* O$_2$ | | | | | 17 |
| Sel'y O$_2$/H$_2$ | | | | | 7.0 |

*in $10^{-6}$ Ncm$^3 \cdot$ cm$^{-2} \cdot$ s$^{-1} \cdot$ cmHg$^{-1}$ or 7.5 $10^{-12}$ Nm$^3 \cdot$ m$^{-2} \cdot$ s$^{-1} \cdot$ Pa$^{-1}$
**upstream pressure (downstream pressure 0.11 MPa)
***upstream pressure (downstream pressure ~0.05 MPa)

TABLE 11

|  | Pure Gases (CO$_2$ and CH$_4$) | Mixture (water saturated) CO$_2$ (30% mol) + CH$_4$ (70% mol) | | Mixture H$_2$ (20% mol) + CH$_4$ (80% mol) | Mixture O$_2$ (20% mol) + N$_2$ (80% mol) |
| --- | --- | --- | --- | --- | --- |
|  | Temp: 20° C. Pr***: 0.8 MPa | Temp: 20° C. Pr**: 2.5 MPa | Temp: 55° C. Pr**: 7 MPa | Temp: 20° C. Pr**: 4 MPa | Temp: 20° C. Pr**: 3 MPa |
| Permeance* CO$_2$ | 162 | 155 | 220 | | |
| Permeance* CH$_4$ | 2.2 | | | | |
| Theoretical Sep'n Factor CO$_2$/CH$_4$ | 74 | | | | |
| Sel'y CO$_2$/CH$_4$ | | 59 | 41 | | |
| Permeance* H$_2$ | | | | 380 | |
| Sel'y H$_2$/CH$_4$ | | | | 135 | |
| Permeance* O$_2$ | | | | | 70 |
| Sel'y O$_2$/H$_2$ | | | | | 6.5 |

*in $10^{-6}$ Ncm$^3 \cdot$ cm$^{-2} \cdot$ s$^{-1} \cdot$ cmHg$^{-1}$ or 7.5 $10^{-12}$ Nm$^3 \cdot$ m$^{-2} \cdot$ s$^{-1} \cdot$ Pa$^{-1}$
**upstream pressure (downstream pressure 0.11 MPa)
***upstream pressure (downstream pressure ~0.05 MPa)

I claim:

1. An asymmetric, aromatic polyimide or copolyimide membrane for gas separation, containing, as monomers, diphenyldi(trifluoromethyl)methane 3,4,3',4'4'-tetracarboxylic acid dianhydride and a monoaromatic metadiamine or a mixture of monoaromatic metadiamines, said membrane comprising a dense skin and a porous substructure and having a theoretical separation factor of about 70 to 110 and an effective selectivity of about 50 to 90 at room temperature in a CO$_2$/CH$_4$ couple.

2. Membrane according to claim 1 wherein the monoaromatic metadiamine is 1,3-diaminobenzene.

3. Membrane according to claim 2 having a theoretical separation factor of about 100 to 110 and a selectivity of about 80 to 90 at room temperature for the CO$_2$/CH$_4$ couple.

4. Membrane according to claim 3 having a theoretical separation factor of about 75 to 85 and a selectivity of about 40 to 70 at 55° C. for the CO$_2$/CH$_4$ couple.

5. Membrane according to claim 1 coated on the skin side with a silicone elastomer layer.

6. An asymmetric, rigid aromatic polyimide or copolyimide membrane for gas separation, containing, as monomers, diphenyldi(trifluoromethyl)methane3,4,3',4'-tetracarboxylicaciddianhydride and a monoaromatic metadiamine, said membrane comprising a dense skin and a porous substructure and having a theoretical separation factor of about 70 to 110 and an effective selectivity of about 50 to 90 at room temperature in a CO$_2$/CH$_4$ couple, wherein the monoaromatic metadiamine is a monomethylated derivative of 1,3-diaminobenzene.

7. An asymmetric, rigid aromatic polyimide or copolyimide membrane for gas separation, containing, as monomers, diphenyldi(trifluoromethyl)methane3,4,3'.4'-tetracarboxylicaciddianhydride and a monoaromatic metadiamine, said membrane comprising a dense skin and a porous substructure and having a theoretical separation factor of about 70 to 110 and an effective selectivity of about 50 to 90 at room temperature in a CO$_2$/CH$_4$ couple, wherein the monoaromatic metadiamine is a dimethylated derivative of 1,3-diaminobenzene.

* * * * *